(12) United States Patent
Schroedl

(10) Patent No.: US 6,868,633 B2
(45) Date of Patent: Mar. 22, 2005

(54) MOLE TRAP

(76) Inventor: Jon R. Schroedl, 6014-95th Dr. SE., Snohomish, WA (US) 98290

( * ) Notice: Subject to any disclaimer, the term of this patent is extended or adjusted under 35 U.S.C. 154(b) by 576 days.

(21) Appl. No.: 09/746,641

(22) Filed: Dec. 21, 2000

(65) Prior Publication Data

US 2004/0025411 A1 Feb. 12, 2004

Related U.S. Application Data

(60) Provisional application No. 60/172,054, filed on Dec. 23, 1999.

(51) Int. Cl.[7] ........................ A01M 23/24; A01M 23/26; A01M 23/28
(52) U.S. Cl. ........................ 43/88; 43/80; 43/96; 43/97
(58) Field of Search .................. 43/96, 97, 80, 43/82, 83, 88, 89, 90, 91, 92, 93, 94, 95, 85

(56) References Cited

U.S. PATENT DOCUMENTS

| 69,878 | A | * | 10/1867 | Westcott | 43/94 |
|---|---|---|---|---|---|
| 81,023 | A | * | 8/1868 | Smith | 43/88 |
| 92,823 | A | * | 7/1869 | Harwood | 43/94 |
| 109,035 | A | * | 11/1870 | Merriman et al. | 43/88 |
| 280,811 | A | * | 7/1883 | Gilleland et al. | 43/94 |
| 288,225 | A | * | 11/1883 | Gilleland | 43/94 |
| 472,038 | A | * | 4/1892 | Durston | 43/94 |
| 615,851 | A | * | 12/1898 | Hooker | 43/88 |
| 1,256,339 | A | * | 2/1918 | Lindquist | 43/88 |
| 1,296,407 | A | * | 3/1919 | Layton | 43/88 |
| 1,382,298 | A | * | 6/1921 | Lonk | 43/90 |
| 1,385,024 | A | * | 7/1921 | Russell | 43/88 |
| 1,557,043 | A | * | 10/1925 | Graham | 43/88 |
| 1,729,976 | A | * | 10/1929 | Wyman | 43/88 |
| 1,924,241 | A | * | 8/1933 | Hassler | 43/94 |
| 2,432,723 | A | * | 12/1947 | Carpenter | 43/88 |
| 2,446,078 | A | * | 7/1948 | Churchill | 43/85 |
| 2,525,383 | A | * | 10/1950 | Troutman | 43/94 |
| 3,800,463 | A | * | 4/1974 | Treadwell | 43/97 |
| 3,896,581 | A | * | 7/1975 | Gabry | 43/81 |
| 4,245,424 | A | * | 1/1981 | Smith | 43/97 |
| 4,439,946 | A | * | 4/1984 | Altier | 43/81 |
| 4,765,087 | A | * | 8/1988 | Holtgrefe, Sr. | 43/94 |
| 4,776,128 | A | * | 10/1988 | Townsend | 43/80 |
| 5,307,587 | A | * | 5/1994 | Zeiger et al. | 43/88 |
| 6,038,809 | A | * | 3/2000 | Dittrick | 43/97 |
| 6,101,761 | A | * | 8/2000 | Sprick | 43/88 |

FOREIGN PATENT DOCUMENTS

| DE | 3101182 | * 11/1981 |
|---|---|---|
| FR | 2726736 | * 5/1996 |

* cited by examiner

Primary Examiner—Peter M. Poon
Assistant Examiner—David J Parsley
(74) Attorney, Agent, or Firm—Dean A. Craine

(57) ABSTRACT

An improved spring-activated mole trap that includes various safety features that make the mole trap safe to use by non-professionals. The mole trap includes a foot bar that enables the individual to activate the trap using his or her foot, a limiting u-shaped member that prevents the trigger arm from snapping rearward and injuring the trapper's fingers if the trap is accidentally activated while being set. The improved trap also includes a pair of handles that extend upward from the tunnel when the trap is vertically aligned in the tunnel. Using the handles, the user is able to more easily position the trap inside the tunnel. The trap further includes a wider, re-aligned trigger located closer to the soil to prevent a mole from burrowing under the trigger plate and thereby avoiding activating the trap.

3 Claims, 4 Drawing Sheets

MOLE TRAP

This is a utility patent application based on a provisional patent application (Ser. No. 60/172,054) filed on Dec. 23, 1999.

BACKGROUND OF THE INVENTION

1. Field of the Invention

This invention relates to animal traps and, more particularly, to animal traps with spring-activated jaws that release a trigger mechanism to kill the animal.

2. Description of the Related Art

Many homeowners are troubled by moles that dig holes and tunnels across their yards. Moles are especially hard to eradicate, because they live underground and are nocturnal. Their tunnels run circuitously across the yard approximately 6 to 12 inches in depth and 4 to six inches in diameter. The mole will dig air holes every 6 to 10 feet along a tunnel. The path of the tunnel is determined by the hardness of the soil, the obstacles in the path, and the plant growth in the soil.

One common trap used to kill moles, shown and described in U.S. Pat. No. 5,307,587 (Zeiger et al.), comprises two u-shaped members, pivotally joined together to form two pairs of scissor-like jaws. A coil spring mounted on a shaft extending transversely between the two unshaped members forcibly closes the two pairs of jaws. Located vertically on the trap is a pivoting trigger arm connected at one end of one of the u-shaped members. The opposite end of the trigger arm engages a pivoting trigger plate. When the trigger arm is engaged on the trigger plate, the trigger arm temporarily holds the u-shaped members in an opened or armed position. When a mole moves under or through the trap, the trigger arm is released, causing the jaws to automatically close around the animal.

In order for the trap to work properly, it must be positioned vertically in the mole's tunnel (see FIG. 2) so that the mole contacts the trip plate when the mole moves between the jaws. Although a mole has limited intelligence, it will recognize a foreign object such as a metal trap placed in its tunnel. If the mole detects the trap, and if the soil around the trap is loose or soft, the mole will dig or burrow into the surrounding soil to avoid the trap. If the soil under and around the trap is hard or undisturbed, the mole may turn around or proceed into the tunnel and activate the trap. Thus, it is important that the trapper properly position the trap inside the tunnel without disturbing the surrounding soil.

Because these traps must be precisely placed into the tunnel in an armed state, most landowners will not use them. What is needed is an improved mole trap that is easier and safer for homeowners to use.

SUMMARY OF THE INVENTION

It is an object of the present invention to provide an improved spring-activated mole trap that is safe to use by homeowners or non-professionals.

It is a further object of the present invention to provide such a mole trap that enables the user to more accurately position the mole trap in the hole.

These and other objects are met by an improved spring-activated mole trap that includes a foot set bar to enable the user to use his or her foot to initially activate the trap, a limiting trigger bar that prevents the trap's jaws from snapping rearward and injuring the trapper's fingers while setting the trap or positioning the trap in the hole, a pair of handles that extend upward from the trap that enable the user to more accurately position the trap inside an existing hole or tunnel without disturbing the tunnel. The improved trap also includes a wider, re-aligned trip plate that is located closer to the soil to prevent a mole from burrowing under the trap, bypassing the clamping jaws, and thus escaping the trap.

DESCRIPTION OF THE PREFERRED EMBODIMENT(S)

Figure 1:
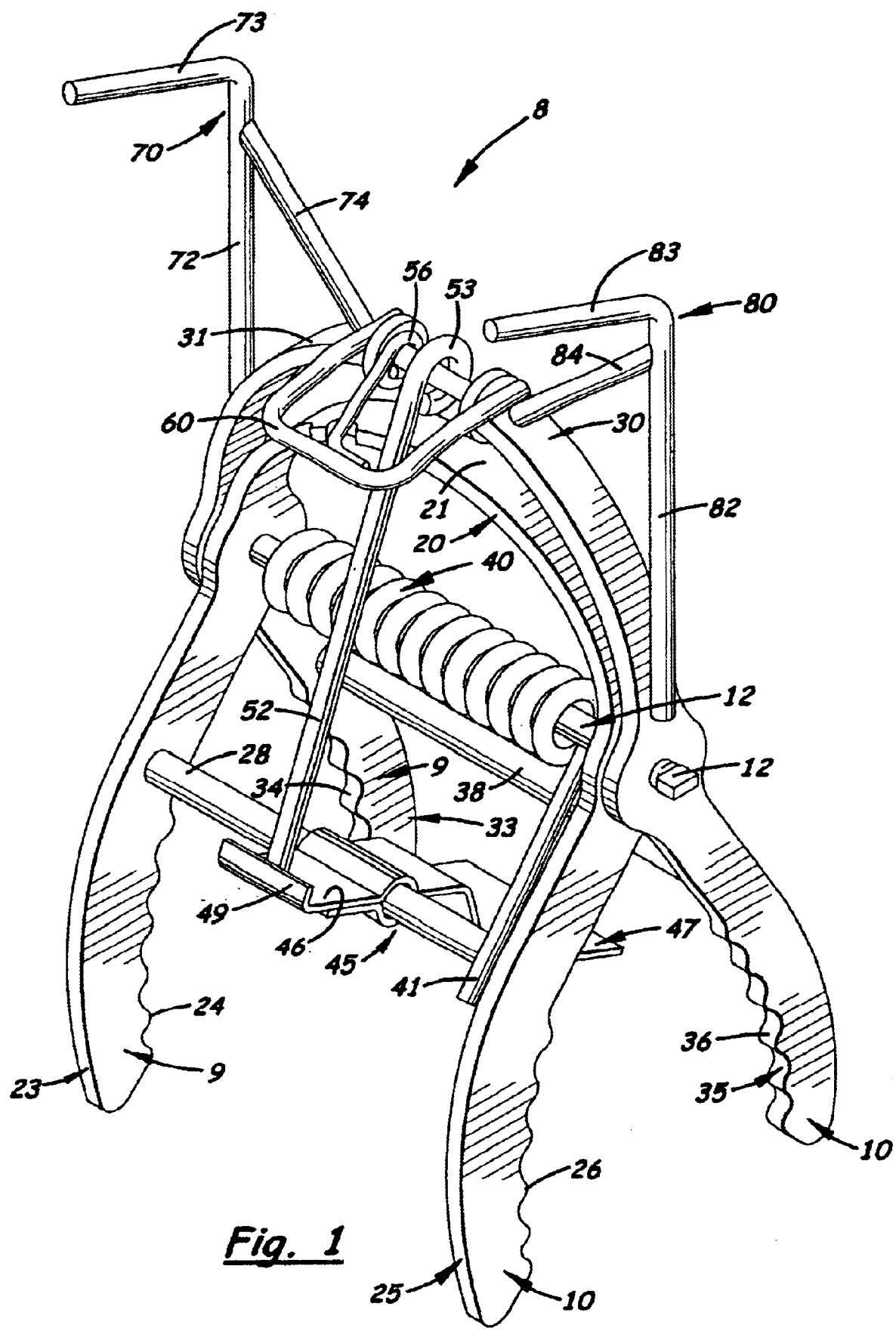
FIG. 1 is a perspective view of the improved mole trap disclosed herein.

In the accompanying FIGS. 1–7, there is shown an improved mole trap 8 designed to address the safety and efficacy problems associated with currently available mole traps.

The mole trap 8 includes two u-shaped members 20, 30 pivotally joined together by a transversely aligned shaft 12. The first u-shaped member 20 is disposed inside the larger second u-shaped member 30. The ends of the shaft 12 extend through the members 20, 30 to hold them together.

Each first and second u-shaped members 20, 30 includes an upper arc section, 21, 31, respectively, and two forward extending legs 23, 25 and two rearward extending legs 33, 35, respectively. Each leg 23, 25, 33, 35 includes a serrated inside surface 24, 26 and 34, 36, respectively. The surfaces 24, 34, and 26, 36 face each other, thereby forming two parallel clamping jaws, generally referred to as 9, 10. The upper arc sections 21, 31 and the legs 24, 25 and 34, 35 are slightly offset in alignment so that the opposing clamping jaws 9, 10 open when the upper arc sections 21, 31 are aligned and registered. Aligned transversely between the two legs 23, 25 on the first u-shaped member 20 is a cross member 28 that supports the centrally located trigger 45. Aligned traversely between the two legs 33, 35 on the second u-shaped member 30 and opposite the cross member 28 is a second cross member 38 which acts as a contact surface for the coil spring 40.

Disposed around the shaft 12 is a coil spring 40. One leg 41 of the coil spring 40 extends downward and presses against the cross member 28 while the opposite leg 42 of the coil spring 40 extends downward and presses against a second cross member 38. During use, the coil spring 40 forces the legs 41, 42 inward thereby causing the two pairs of clamping jaws 9, 10 to close.

A safety latch 56 located centrally on the upper arc portion 31 is also provided, which is used to hold the first and second unshaped members 20, 30 in an aligned position, and to open clamping jaws 9 and 10.

Pivotally attached to the upper arc portion 31 of the second u-shaped member 30 is a trigger rod 52. The trigger rod 52 includes an eyelet 53, which surrounds the member 30 and enables the trigger rod 52 to rotate freely therearound. The trigger rod 52 has a sufficient length so that the tip of the trigger rod 52 touches the upper trigger plate 46 located on the improved trigger mechanism 45 discussed further below. Formed on the distal end of the upper trigger plate 46 is an upward extending lip 49 which, when the mole trap 8 is armed, is engaged by the trigger rod 52.

During normal use, the upper arc sections 21, 31 of the first and second unshaped members 20, 30, respectively, are manually forced together into an aligned position, and the clamping jaws 9, 10 are opened. The safety latch 56 is then used to hold the two u-shaped are members 21, 31 in an aligned position to open the two pairs of clamping jaws 9, 10. The trigger rod support plate 44 is then rotated on the cross member 28 so that the tip of the trigger rod 52 engages the extending lip 49. The mole trap 8 may then be positioned vertically in the mole's tunnel 90, shown in FIG. 2.

The first improvement to the mole trap 8 includes the limiting means for the trigger rod 52 that prevents the trigger rod 52 from snapping rearward and injuring the trapper's fingers while arming or setting the mole trap 8. The limiting means for the trigger rod 52 is a u-shaped member 60 attached to the upper arc 31 of the second u-shaped member 30. The u-shaped member 60 extends forward and prevents the trigger rod 52 from rotating upward more than approximately 45 degrees, thus protecting the trapper's hands and fingers placed on the member 30 if the safety latch 56 and the trigger rod 52 are accidentally released.

Figure 2:
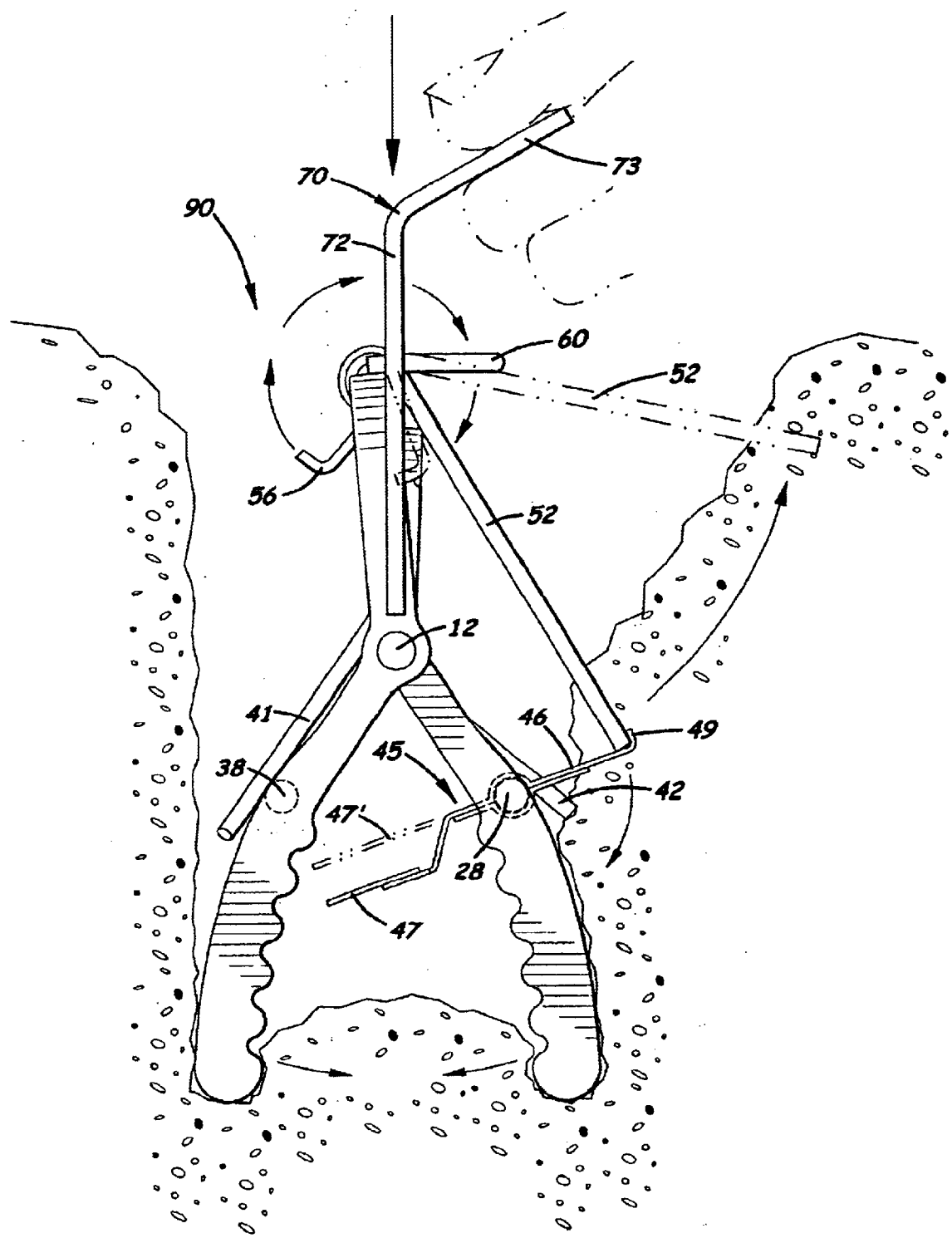
FIG. 2 is a side elevational view of the improved mole trap.

The second improvement is a pair of handles 70, 80 that extend upward from opposite sides of the mole trap 8. During use, the handles 70, 80 enable the mole trap 8 to be held safely with two hands. The handles 70, 80 are longitudinally aligned with the second u-shaped member 30 so that the mole trap 8 may be held vertically, and forced into the tunnel 90 as shown in FIG. 2. The handles 70, 80 also have sufficient length so that if the mole trap 8 is accidentally activated, the trapper's hands and fingers will not be injured. In the embodiment shown in FIGS. 1 and 2, each handle 70, 80 includes a long longitudinally aligned member 72, 82, respectively, attached at one end to the outer edges of the second u-shaped member 30. Formed integrally on the distal end of each longitudinally aligned member 72, 82 is a rearward extending member 73, 83, respectively, which act as gripping surfaces. Each handle 70, 80 may also include a support member 74, 84 that extends diagonally outward from the central axis of the upper arc portion 31 to the longitudinally aligned member 72, 82, respectively, to provide support when positioning the mole trap 8 in the tunnel 90.

The third embodiment of the mole trap 8 includes an improved trigger mechanism 45 designed to prevent the mole from moving under or around the mole trap 8, bypassing activating the mole trap 8 when placed it inside the tunnel 90. The improved trigger mechanism 45 includes a z-shaped plate 46 with an upper trigger plate 46 and a lower trigger plate 47. As shown in FIG. 2, the lower trigger plate 47 is offset and extends below the longitudinal axis of the upper trigger plate 46 thereby disposing it closer to the soil in the bottom of the tunnel 90. In the prior art, the trigger plate 47', shown by phantom lines, is straight, thereby creating a larger escape route for a mole. The improved trigger plate 47 is wider and positioned closer to the soil so that the mole must contact the trigger plate 48 when moving between the two pairs of clamping jaws 9, 10.

Figure 3:
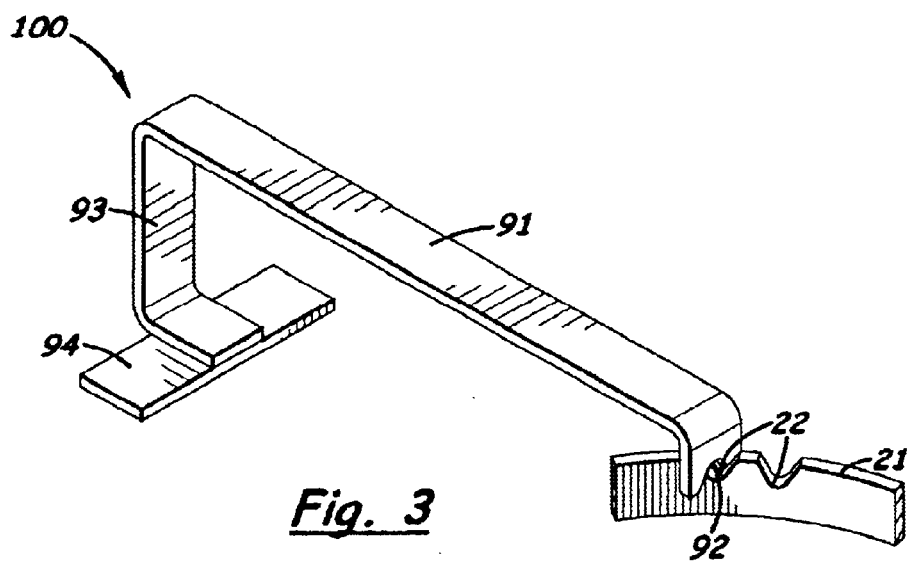
FIG. 3 is a perspective view of the foot pedal used to activate the mole trap.
Figure 4:
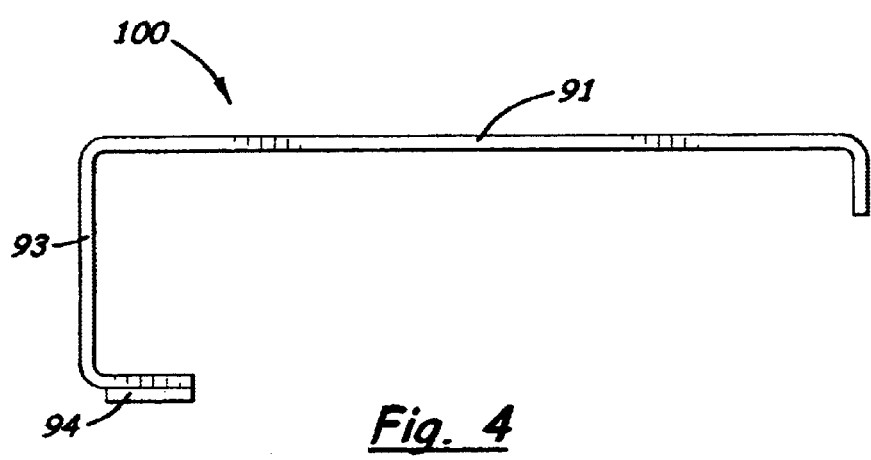
FIG. 4 is a side elevational view of the foot pedal.
Figure 5:
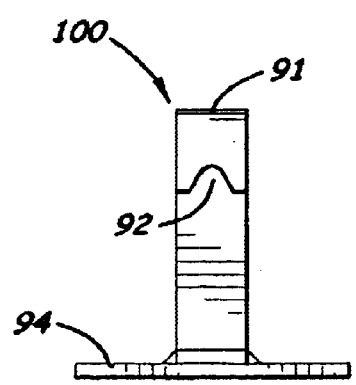
FIG. 5 is a front elevational view of the foot pedal.
Figure 6:
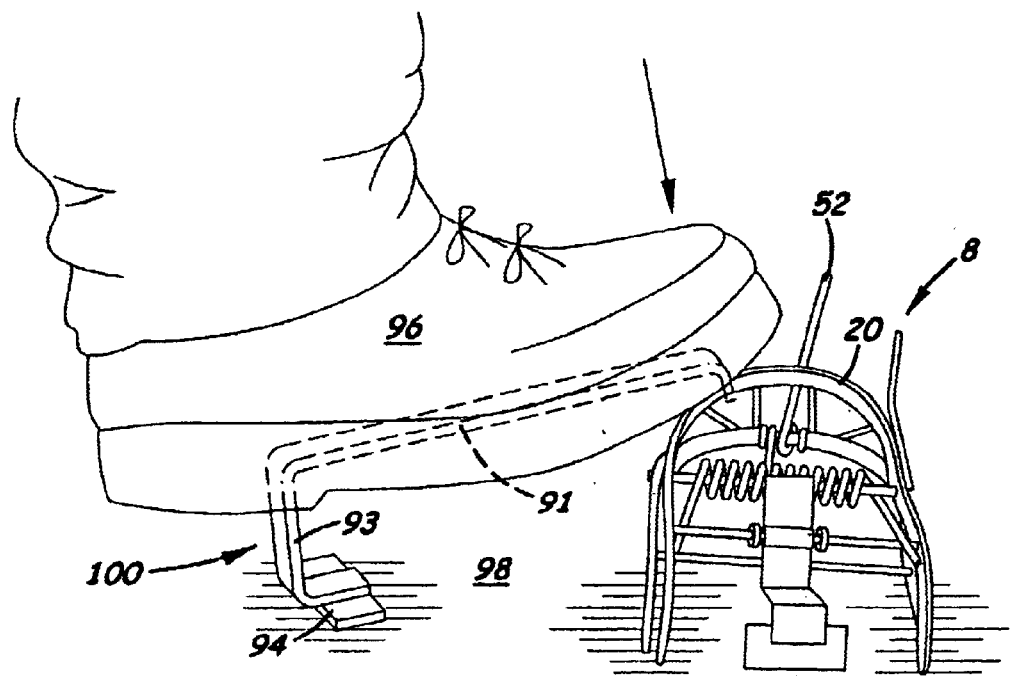
FIGS. 6–7 are side elevational views of the mole trap being armed by a trapper using the foot pedal.
Figure 7:
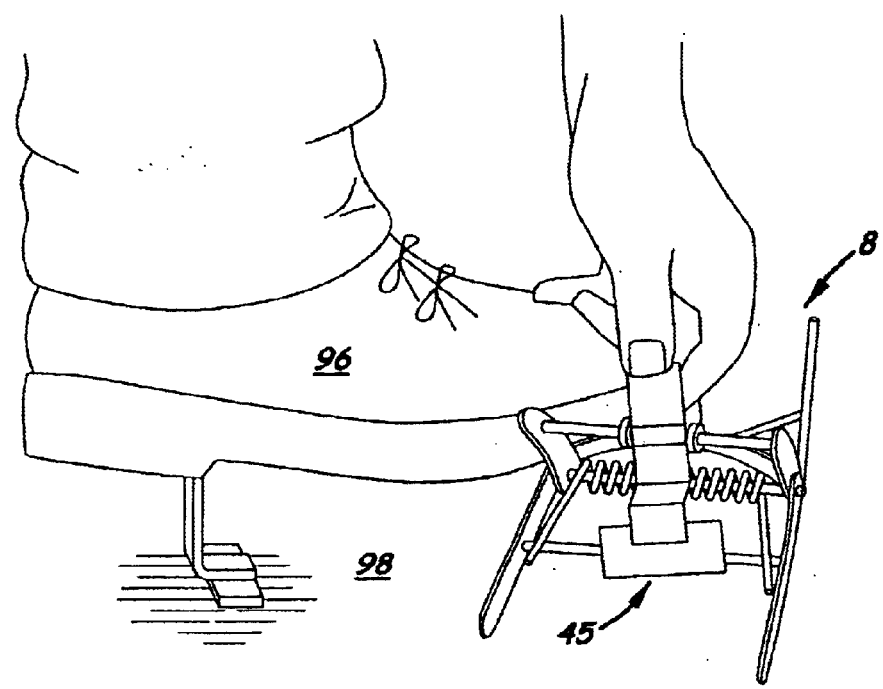

The fourth improvement is shown in FIGS. 3–6 and includes a foot bar 100. As shown in FIGS. 3–4, the foot bar 90 includes an elongated bar 91 with a v-shaped notch 92 formed on its distal end. Integrally formed on its opposite end is a short, perpendicularly aligned leg 93 that attaches to a perpendicularly aligned base plate 94. As shown in FIGS. 6 and 7, during use, the trapper places the mole trap 8 on the ground 98, then disposes the foot bar 100 on one side of the mole trap 8, so that the notch 92 on the elongated bar 90 is placed against the notch 22 on the first u-shaped member 20. The trapper then places his or her foot 96 on the foot bar 100 and steps downward to align the upper arc sections 21, 31. The safety latch 56 is then used to hold the arc sections to 21, 31 together.

During use, the trapper selects an improved mole trap 8 and places it on a firm surface so that the first u-shaped member 20 extends upward and above the second u-shaped member 30. The foot bar 100 is then selected and used to activate the trap 8. The trigger rod 52 is then positioned to engage the trigger plate 48, and the safety latch 56 is then used to hold the arc portions 21, 31 of the u-shaped members 20, 30, respectively, together. The user may lift his foot 96 and remove the foot bar 100.

Next, the trapper selects an air hole made by the mole. The top layer of dirt around the air hole may be removed to provide access to the tunnel 90. The trapper then grabs the two handles 70, 80 with both hands and positions the trap 8 vertically so that the clamping jaws 9, 10 are facing downward, then forces it firmly downward into the soil. Because the sides of the tunnel 90 must not be disturbed, considerable force must used to force the mole trap 8 into the tunnel 90. The mole trap 8 must be vertically and centrally aligned inside the tunnel 90 so that a mole moving longitudinally inside the tunnel 90 passes between the two clamping jaws 9, 10 transversely aligned in the tunnel 90. Small rocks may be placed in the sides of the tunnel 90 and under the trigger plate 48 to discourage the mole from detecting and digging around or under the mole trap 8. Once properly positioned inside the tunnel 90, the safety latch 56 is removed, and the mole trap 8 is now ready to operate.

In compliance with the statute, the invention, described herein, has been described in language more or less specific as to structural features. It should be understood, however, the invention is not limited to the specific features shown, since the means and construction shown comprise only the preferred embodiments for putting the invention into effect. The invention is, therefore, claimed in any of its forms or modifications within the legitimate and valid scope of the amended claims, appropriately interpreted in accordance with the doctrine of equivalents.

I claim:

1. An improved combination spring-activated mole trap and foot bar, said mole strap includes two u-shaped members pivotally connected together, each said u-shaped member including an upper arc section and two extending legs, said legs being aligned to form two pairs of clamping jaws, said pair of clamping jaws being biased so that when released, said clamping jaws converge to kill a mole located therebetween, the mole trap also including a trigger rod pivotally attached to one clamping jaw that selectively holds both said clamping jaws in an opened, biased position when set and, automatically released when sufficiently moved by a mole, thereby causing said jaws to converge and kill a mole, the improvement comprising:

a. a pair of handles longitudinally aligned and extending from said upper arc member enabling said mole trap to be held in a vertically aligned position and inserted into a mole tunnel opening;

b. a limiting means for said trigger rod to prevent excessive upward rotation of the trigger rod when said clamping jaws converge;

c. a pivoting trigger plate capable of engaging the end of said trigger rod, said trigger plate being z-shaped with an upper trigger plate and a lower trigger plate, said lower plate being offset from said upper trigger plate so that said lower trigger plate is placed closer to a mole burrowing under said trap when said trigger rod engages said upper trigger plate, and;

d. a foot bar enabling said jaws to be manually separated by the user's foot pressed downward onto said mole trap, said foot bar including an elongated bar with an arc-engaging surface at one end, so that when said mole trap is aligned longitudinally on a support surface, said arc-engaging surface placed against said upper arc portion on one said u-shaped member and the user's foot placed on said elongated bar to force said clamping jaws apart into a set position.

2. The improved spring-activated mole trap as recited in claim 1, wherein said triggeing rod is pivotally attached at one end to one said upper arc section on one said u-shaped member and extends downward to engage said upper trigger plate to hold said clamping members apart, said limiting means for said trigger rod being a u-shaped member designed prevent excessive upward rotation of said trigger rod around said u-shaped member when said trigger rod is released and said clamping jaws converge.

3. A method of setting a spring-activated mole trap, comprising the following steps:

a. selecting a spring activated mole trap, said mole trap including two u-shaped members pivotally connected together, each said u-shaped member including an upper arc section and a two extending legs, said legs being aligned to form two pairs of clamping jaws that clamp together to kill a mole, said pair of clamping jaws being biased so that when released, said clamping jaws automatically converge to kill a mole located therebetween, the mole trap also includes a z-shaped plate with a upper trigger plate and a lower trigger plate offset from said upper trigger plate so that said lower trigger plate is closer to a surface of soil located under said mole trap, said trigger rod being pivotally attached at one end to one said clamping jaw and extending downward therefrom to engage said upper trigger jaw plate and block the movement of the clamping jaw opposite said one clamping jaw to prevent said pair of clamping jaws from clamping together, and a limiting means for said trigger rod to prevent excessive upward rotation of said trigger rod when said clamping jaws converge, said mole trap also including two longitudinally aligned handles attached to said upper arc sections on said u-shaped members;

b. selecting a mole tunnel opening, said mole tunnel opening having a lower soil surface;

c. selecting a foot bar used to pry said claws on said trap apart to activate said mole trap;

d. activating said mole trap with said foot bar;

e. grasping said handles to move said mole trap, and;

f. vertically inserting said mole trap into said mole tunnel opening so that said jaws are transversely aligned inside said mole opening and said trigger plate is positioned adjacent to said lower soil surface inside said mole tunnel opening.

* * * * *